United States Patent Office 3,590,081
Patented June 29, 1971

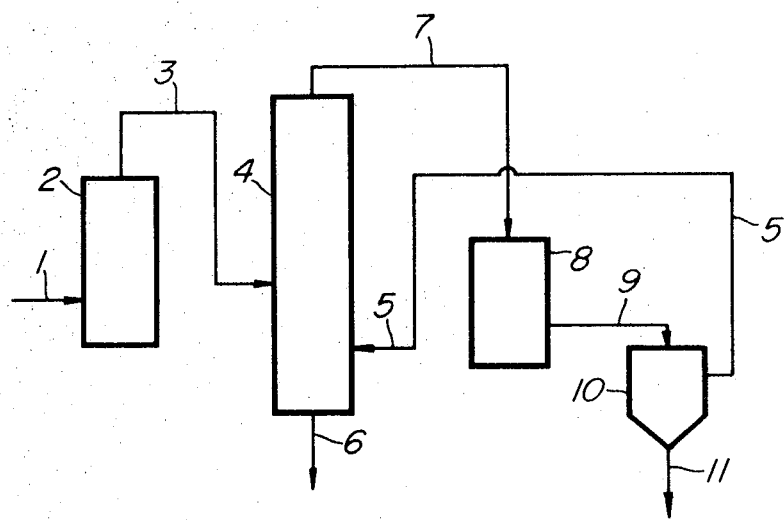

3,590,081
PROCESS FOR THE PREPARATION AND
RECOVERY OF ACETIC ANHYDRIDE
Shinichi Ishida, Kunio Sato, Toshiaki Yamazaki, and Noboru Ohshima, Tokyo, Japan, assignors to Asahi Kasei Kogyo Kabushiki Kaisha, Osaka, Japan
Filed July 12, 1967, Ser. No. 652,972
Claims priority, application Japan, July 21, 1966, 41/47,326
Int. Cl. C07c 51/56
U.S. Cl. 260—549
6 Claims

ABSTRACT OF THE DISCLOSURE

A process for preparing acetic anhydride and aldehydes by thermal decomposing methylene glycol diacetate, or polymethylene glycol diacetate in a vapour phase at a temperature of 200°–600° C. in the presence of a solid catalyst. The diacetate is represented by the general formula

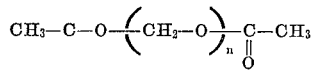

where $n$ is an integer of 1–100. Typical catalyst is a mixture of alumina or silica gel and alkali metal halides.

The decomposition is preferably carried out in an inert organic medium having a boiling point of −20°–130° C. Examples of the medium are n-hexane and petroleum ether.

---

The present invention relates to a process for the preparation of acetic anhydride and formaldehyde from diacetate of methylene glycol or polyoxymethylene glycol.

It is known that diesters of the general Formula A given below, of methylene glycol, substituted methylene glycol or polyoxymethylene glycol with carboxylic acid, are generally dissociated into acid anhydride and aldehyde upon pyrolysis. Such pyrolysis is known as an equilibrium reaction represented by the Formula B (The Journal of the American Chemical Society 53, 3905 (1931)).

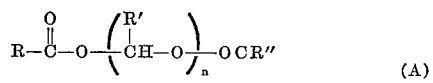

(A)

wherein R and R″ may be different or the same and stand for alkyl, cycloalkyl, aralkyl, aryl and alkylaryl which may be substituted by halogen; R′ stands for hydrogen or the same group as R and R″; and $n$ is an integer from 1 to 100.

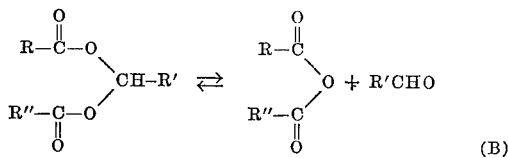

(B)

These thermal decompositions represented by the formula set out above have been studied from an academical point of view and the thermal decomposition has been carried out at a temperature of from 200° to 300° C., and the decomposition mechanisms and rate constants of reaction have been determined at that temperature.

There are many unsubstituted diesters which do not produce a sufficiently high yield when thermally decomposed at a temperature of 200° to 300° C. in the absence of catalyst and in the case of using methylene diacetate, for example only a low conversion is obtained at such conditions. Thus, for these diesters, the conventional method of pyrolysis is in no way acceptable for industrial applications and is of no economical advantage at all.

In view of the above, the present inventors have conducted a further study on the decomposition mechanism of the type described and found that the reaction could be carried out in an economical manner with high yield at temperatures above 600° C. in the absence of catalyst and with a relatively short retention time. In other words, it has been dsicovered that, in order to carry out the reaction at an industrially acceptable speed and with high yield in the absence of catalyst, the reaction should be conducted at a temperature of 600° C. or higher.

Reaction at such a high temperature, however, not only makes it difficult to select the material for the reaction apparatus to be used, but also results in an increasing amount of by-products, generation of noncondensed gases, formation of resinous products and increasing carbonization, all of which will reduce the selectivity.

Under the circumstances, there has been a desire for an improved reaction system which is satisfactory in respect of material selection, permits less gasification and is of high selectivity, but so far no such reaction system has ever been available.

Now it has been found that a highly economical result could be obtained by carrying out the reaction in a vapor phase using a solid catalyst.

Solid catalysts which may be used in the present invention include silica and alumina, such as alumina, silica gel, clay, active clay and kieselguhr, and alkali metal halides and mixtures thereof. In practice, these alkali metal halides are supported on a solid particle carrier, sintered or calcined.

Examples of the catalyst actually to be used are alumina, silica gel, active clay, fuller's earth, kieselguhr, silica-alumina, sodium chloride, potassium chloride, potassium fluoride or combinations thereof, and said catalysts supported on a suitable carrier.

Silica gel or kieselguhr may be used as carrier besides as catalyst. It is particularly preferable to use silica gel and sodium chloride or silica gel and potassium chloride in combination, because these combination catalysts give high activity and selectivity at low temperatures and have a long catalyst life and inexpensive. Active carbon may also be used as carrier.

According to the present invention, it is possible, by the use of the catalysts described, to drastically improve the yield at the reaction temperature of from 200° to 600° C., preferably from 200° to 450° C.

The present invention, therefore, is of great industrial significance in that, by employing the catalysts depicted above and by carrying out the reaction at low temperatures, the percentages of gasification, resinification and carbonization in the reaction are lowered; the yield and selectivity are improved markedly; and selection of material and heating are rendered easy.

The process of the present invention may be operated at a temperature of 200° to 600° C. and a temperature even higher than 600° C. However, in general, the process is preferably carried out at low temperatures from the standpoint of the material of the reaction apparatus and economy. Even at a temperature of 200° C. or below, the reaction proceeds at an efficiency several times to several hundred times higher than that of thermal decomposition, though the one pass yield is reduced somewhat. However, in consideration of the capacity of the apparatus used and effectiveness of reaction, it is most preferably to carry out the reaction at a temperature of from 200° to 450° C.

It is also to be noted that the process of the invention may be carried out under either reduced pressure or normal pressure. It may also be possible to use a suitable carrier gas or a dilution gas, if necessary.

Illustrative of the glycol diesters which are usable in the process of the invention are methylene diacetate, polyoxymethylene diacetate, methylene dipropionate, methylene dibutyrate, methylene diisobutyrate, methylene dicaproate, methylene distearate and methylene dibenzoate.

However, a process such as of the present decomposition, when carried out in a liquid phase, does not always operate satisfactorily. For instance, by the decomposition of ethylidene diacetate in a liquid phase at a temperature of about 140° C. using ferric chloride as catalyst, acetic anhydride and acetaldehyde are obtained, but the decomposition reaction stops in a very short time after the reaction is started and thus the catalytic efficiency is very low. Furher continuation of the reaction requires the addition of a substantial amount of fresh catalyst from time to time. In addition, recovery and re-use of the catalyst are impossible due to the resinous material formed in the reaction system as by-product. Such a process, therefore, is of no economical advantage at all.

In contrast thereto, according to the process of the instant invention, wherein the reaction is carried out in a gas phase, it is possible to maintain the activity of the catalyst used substantially on the same level, to prolong the catalyst life to a surprising degree and to recover the activity of the catalyst by heating it with air even if the activity is lowered. As may be readily understood from the foregoing, the gas phase reaction according to the present invention is much advantageous compared with the liquid phase reaction.

The application of the process of the invention for the polyoxymethylene industry is highly advantageous and is, in fact, necessary for the recovery of acetic anhydride and formaldehyde from methylene diacetate. In the production of polyoxymethylene diacetate there are often by-produced a large amount of methylene diacetate and in some cases a mixture of polymethylene diacetates having various degrees of polymerization ($=n$ of 2 to 100), which are observed by NMR, are present with methylene diacetate. When recovering formaldehyde and acetic anhydride, a further devise should be made to the decomposition system for the following reason. Namely, formaldehyde tends to polymerize very easily at a temperature below its ceiling temperature (which is said to be 127° C.) to give polyformaldehyde, concurrently with the condensation of acetic anhydride during the step of separating the acetic anhydride from the mixed gas upon completion of decomposition reaction, and this polyformaldehyde will precipitate on the wall of a pipe and finally clog the pipe, necessitating a troublesome operation for its removal. This problem has also been solved by the present invention.

According to another aspect of the present invention, that is, there is provided a process by which separation of acetic anhydride is effected in an efficient manner, while preventing polymerization of formaldehyde. The present inventors have discovered that formaldehyde would not polymerize in an inert organic medium at its boiling temperature, even in the presence of a substance which, under normal conditions, would induce polymerization of formaldehyde. Based on this discovery, according to the present invention, the mixture of formaldehyde and acetic anhydride gases, obtained in the manner described hereinabove, is introduced into a boiling organic medium which is inert both to formaldehyde and to acetic anhydride, whereby the formaldehyde is separated in the form of gas from the condensate of acetic anhydride.

The organic media to be used may be those whose boiling points are within the range from −20° to 130° C., and preferably those whose boiling points differ largely from that of acetic anhydride.

Among those organic media may be mentioned aliphatic hydrocarbons such as n-butane, n-hexane and cyclohexane; aromatic hydrocarbons such as benzene and toluene; low boing fractions of petroleum such as petroleum ether and petroleum benzene; esters such as methylacetate and ethylacetate; nitriles such as acetonitrile and propionitrile; and ethers such as ethylether and tetrahydrofuran.

Now, a preferred embodiment of the process according to the present invention will be described with reference to the accompanying drawing (see FIG. 1).

Methylene diacetate as material is fed through pipe 1 into a decomposing apparatus 2, wherein it is decomposed and the resultant acetic anhydride and formaldehyde are led into a fractionating column 4 in a gaseous state together with a small amount of undecomposed methylene diacetate gas. On the other hand, a separating medium is introduced into the fractionating column 4 through a pipe 5, wherein it is boiled and evaporated, and ascends in said column in mixture with the decomposed gases. During this period, acetic anhydride and the undecomposed methylene diacetate are condensed and flow downwardly to be collected through a pipe 6, whereas formaldehyde is led in mixture with the separating medium into a polymerization tank 8 through a pipe 7 which is connected to the top of the fractionating column 4, and therein it is subjected to polymerization. The mixture of resultant polyformaldehyde and the separating medium is introduced into a separator 10 through a pipe 9 in the form of slurry, wherein the polyformaldehyde is separated from the separating medium. The polyformaldehyde thus separated is removed from the system through pipe 11, whereas the separating medium is circulated through the pipe 5 into the fractionating column for re-use.

In the manner described, it is possible, by properly selecting a suitable separating medium and decomposition conditions, to recover acetic anhydride from the mixture with formaldehyde at the yield of 90% or higher, without involving clogging of the pipe and polymerization.

The present invention will be further illustrated by way of examples given hereunder. It should, however, be understood that the invention is not restricted thereto but many modifications are possible without deviating from the scope of the invention as set out in the appended claims.

EXAMPLES 1–3

A quartz tube having an inner diameter of 22 mm. was inserted in a tubular electric furnace having a 35 cm. long heating zone and inclined at an angle of 30 degrees, and interior of the quartz tube was filled with 55 ml. silica gel (6 mesh pass 10 mesh stop). Raw material was fed into the tube from the top end thereof by means of a quantitative pump or was introduced into said tube in the form of gas after previously heating the same separately. The reaction product was drawn through a condenser connected to the lower end of the quartz tube and collected in a water-cooled trap.

By treating a part of the reaction product with excess water acid anhydride was converted into acid. The total amount of acid was measured by neutralization titration. On the other hand, the amounts of unreacted diester and by-product were measured by means of gas chromatography and infrared absorption spectrum. The process described above was repeated at various temperatures and rates of feeding, using 20 g. methylene diacetate (57° to 58° C./9 mm. Hg) at each run, the result of which are shown in the table below.

|  | Reaction temperature (° C.) | Rate of feeding (g./min.) | Conversion, (percent) | Yield of acetic anhydride (percent) | Selectivity (percent) |
|---|---|---|---|---|---|
| Run: | | | | | |
| 1 | 200 | 0.16 | 16.4 | 16.0 | 97.5 |
| 2 | 300 | 0.35 | 27.0 | 25.3 | 94.2 |
| 3 | 450 | 0.36 | 75.4 | 68.6 | 92.1 |
| Reference Examples: | | | | | |
| 1 | ¹ 200 | 0.16 |  | (²) |  |
| 2 | ² 450 | 0.36 | 40.2 | 31.1 | 77.0 |
| 3 | ¹ 600 | 0.36 | 88.2 | 58.6 | 66.0 |

¹ Quartz chip was used in lieu of silica gel.
² Unobtainable.

In reference Examples 2 and 3, intense gasification and attachment of carbon on the quartz chip were observed and further the reaction product was colored heavily.

EXAMPLES 4–8

Using the same apparatus as in Example 1, decomposition of methylene diacetate was conducted using 50 ml. of various catalysts depicted below at temperatures of the furnace of 240° to 250° C., by feeding the methylene diacetate at the rates of 0.4 to 0.6 g./min. The results are shown in the table below.

| Catalyst | Conversion (percent) | Yield of acetic anhydride (percent) | Selectivity (percent) |
|---|---|---|---|
| Run: | | | |
| 4... Alumina | 18.5 | 18.2 | 98.8 |
| 5... Silica-alumina | 23.6 | 22.6 | 95.6 |
| 6... Active clay | 21.8 | 21.0 | 96.6 |
| 7... Silica gel-sodium chloride | 83.8 | 82.6 | 98.7 |
| 8... Silica gel-potassium chloride | 88.2 | 86.1 | 97.6 |

NOTE.—The content of salt in the combination catalyst was from 4 to 5%.

EXAMPLE 9

50 ml. silica gel-5% sodium chloride catalyst, which had previously been dried and calcined, was charged in the same apparatus as in Example 1 and reaction was conducted by feeding a mixture of methylene diacetate and polyoxymethylene diacetate ($n=2$ to 8) at the rate of 0.4 to 0.5 g./min. The results are shown in the table below.

| Diester | Reaction temperature (° C.) | Conversion (percent) | Yield of acetic anhydride (percent) | Selectivity (percent) |
|---|---|---|---|---|
| Run: 16.. Mixture of methylene diacetate and polymethylene diacetate. | 400 | 92.6 | 80.0 | 86.4 |

EXAMPLES 10–15

40 ml. silica gel-5% potassium chloride catalyst, which had previously been dried and calcined at a temperature of 330° to 350° C., was charged in the same apparatus as in Example 1 and decomposition of methylene diacetate was conducted at a temperature of 300° to 310° C. by feeding the same at various rates depicted below. The results are shown in the table below.

|  | Rate of feeding (g./min.) | Space velocity (hour⁻¹) | Conversion (percent) | Yield of acetic anhydride (percent) | Selectivity (percent) |
|---|---|---|---|---|---|
| Run: | | | | | |
| 10 | 0.61 | 320 | 95.5 | 86.0 | 93.1 |
| 11 | 1.86 | 995 | 90.2 | 85.0 | 95.0 |
| 12 | 12.60 | 6,080 | 86.1 | 82.5 | 95.8 |
| 13 | 28.00 | 11,100 | 78.3 | 75.7 | 96.7 |
| 14 | 1.26 | 912 | 91.0 | 86.6 | 95.0 |
| 15 ¹ | 11.40 | 5,800 | 87.8 | 85.2 | 97.1 |

¹ Nitrogen was mixed at the rate of 0.2 l./min.

EXAMPLE 16

In the same manner as in Example 7, methylene diacetate was fed in a decomposing apparatus, with silica gel-sodium chloride catalyst charged therein, at the rate of 70 g./hr. and the gases generated were led into a pot disposed at the bottom of a 60 cm. high packed column wherein such solvent as n-hexane, ethylether, acetonitrile or acetone was distilled under reflux at the rate of 50 g./hr.

The top of the column was maintained at a temperature from 5° C. below to 5° C. above the boiling temperature of said solvent, whereby acetic anhydride in the mixed gas was condensed and collected in a receptacle which was connected to said pot. The mixture of formaldehyde gas and solvent vapor flowing out from the top of the column was introduced into a polymerizer which had previously been charged with 150 g. of the same solvent containing 0.05 g. triethylamine. The formaldehyde was caused to polymerize in the polymerizer under vigorous stirring while being maintained at a temperature of 15° to 20° C., and collected as polyformaldehyde. The process described above was operated continuously for 120 minutes, with the result shown below.

The amount of acetic anhydride collected upon separation was measured, based on acetic acid, by neutralization titration after hydrolysis.

|  | Run | | | |
|---|---|---|---|---|
|  | 1 | 2 | 3 | 4 |
| Medium | n-Hexane | Acetonitrile | Ethylether | Acetone |
| Recovery ratio of acetic anhydride (percent) | 96.2 | 92.3 | 98.2 | 93.8 |
| Recovery ratio of formaldehyde (percent) | 93.2 | 95.3 | 90.1 | 88.3 |
| Acetic anhydride transferred into polymerization tank (percent) | 2.3 | 5.1 | 1.3 | 3.3 |

EXAMPLE 17

Methylene diacetate and n-hexane were subjected to catalytic decomposition by passing them through a decomposition apparatus at the rate of 20 to 21 g./hr. respectively, said decomposition apparatus being filled with silica gel-sodium chloride catalyst and maintained at a temperature of 250° C. The decomposed gases thus obtained, consisting of formaldehyde, acetic anhydride and methylene diacetate at the mol ratio of 1.0:0.93:0.18, were introduced into the same refluxing column as in Example 1 from the bottom thereof. The acetic anhydride and unreacted methylene diacetate being discharged from the bottom of column was collected in an acetic anhydride receptacle, while the mixed gas of formaldehyde and n-hexane, flowing out from the top of column, was passed through a trap, which was cooled to −15° C., to remove n-hexane and impurities therefrom, and thereafter the formaldehyde was polymerized in the same manner as in Example 16. The process described above was continuously operated for 3 hours, as a result of which 93.3% of acetic anhydride and 99.2% of methylene diacetate were recovered in the receptacle below the refluxing column, and 89.2% of formaldehyde was collected in the form of polymer which had a viscosity of 2.83 ($\eta_{sp./c.}$). 7.9% of formaldehyde was solved in sodium sulfite.

What is claimed is:

1. A process for preparing acetic anhydride and formaldehyde which comprises subjecting at least one compound of the formula

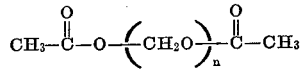

wherein $n$ is an integer of 1 to 100, to thermal decomposition in the vapor phase at a temperature of 200° to 600° C. in the presence of at least one solid catalyst selected from the group consisting of alumina, silica, silica gel, silica-alumina, active clay and an alkali metal halide.

2. A process according to claim 1 wherein the thermal decomposition is effected at a temperature of 200° to 450° C.

3. A process according to claim 1 wherein the said catalyst is supported on a carrier.

4. A process according to claim 1 wherein said compound is methylene glycol diacetate.

5. A process for preparing formaldehyde and acetic anhydride by the thermal decomposition of methylene glycol diacetate which comprises employing boiling medium vapor of an inert organic compound having a boiling point of −20° to 130° C. as a medium for the separation of formaldehyde from acetic anhydride.

6. A process according to claim 5 wherein the inert organic medium is at least one member selected from the group consisting of n-hexane, cyclohexane, petroleum benzine, acetonitrile, acetone and diethylether.

References Cited

UNITED STATES PATENTS

| | | | |
|---|---|---|---|
| 1,152,098 | 9/1915 | Kaufler | 260—549 |
| 2,001,211 | 5/1935 | Müller et al. | 260—123 |
| 2,050,287 | 9/1936 | Dreyfus | 260—123 |
| 2,106,798 | 2/1938 | Dreyfus | 260—123 |

FOREIGN PATENTS

| | | | |
|---|---|---|---|
| 391,802 | 5/1933 | Great Britain | 260—549 |
| 447,690 | 10/1936 | Great Britain | 260—549 |

LEWIS GOTTS, Primary Examiner

P. J. KILLOS, Assistant Examiner

U.S. Cl. X.R.

260—606